May 20, 1958

R. WESTBURY ET AL 2,835,461

AIRCRAFT FEEL SIMULATOR

Filed Dec. 13, 1955

2 Sheets-Sheet 1

INVENTORS
Roy Westbury
Charles Philip Snell
By Moses, Nolte, Crews & Berry
ATTORNEYS May 20, 1958

R. WESTBURY ET AL 2,835,461

AIRCRAFT FEEL SIMULATOR

Filed Dec. 13, 1955

2 Sheets—Sheet 2

United States Patent Office 2,835,461
Patented May 20, 1958

2,835,461

AIRCRAFT FEEL SIMULATOR

Roy Westbury, Bridgnorth, Salop, England, and Charles Philip Smith, Ramsey, Isle of Man, assignors to H. M. Hobson Limited, London, England, a British company Application December 13, 1955, Serial No. 552,941

Claims priority, application Great Britain December 15, 1954

10 Claims. (Cl. 244—83)

This invention relates to a hydraulic feel simulator for use in aircraft having power-operated control surfaces, or in which the control surfaces are fitted with servo tabs, of the kind, described for example in United States application No. 407,536/1954, now Patent No. 2,783,006, comprising a hydraulic jack, constituted by a piston and a housing therefor, a linkage operable by the pilot's control member to effect relative movement of the piston and housing in opposition to the hydraulic pressure in the housing and means for increasing the hydraulic pressure in the housing as the airspeed increases.

In such a system, the hydraulic jack imposes a hydraulic feel on the control member which varies with airspeed. The hydraulic feel, however, disappears in the event of failure of the hydraulic pressure supply with the result that the pilot may inadvertently move his control member to a dangerous extent. The object of this invention is to provide for reversion to a fixed level of mechanical feel in the event of failure of the hydraulic feel.

The invention accordingly provides a hydraulic feel simulator of the above kind comprising a spring system which offers no substantial resistance to movement of the pilot's control member so long as hydraulic pressure prevails in the housing of the jack but becomes automatically effective to impose mechanical feel on the pilot's control member on failure of the hydraulic pressure.

The invention includes a hydraulic feel simulator of the above kind comprising a spring system for opposing movement of the pilot's control member and means operative so long as hydraulic pressure prevails in the housing of the jack for displacing the spring system to an ineffective position in which it offers no substantial resistance to movement of the control member, the spring system returning automatically to effective position on failure of the hydraulic pressure.

Figures 1, 2:
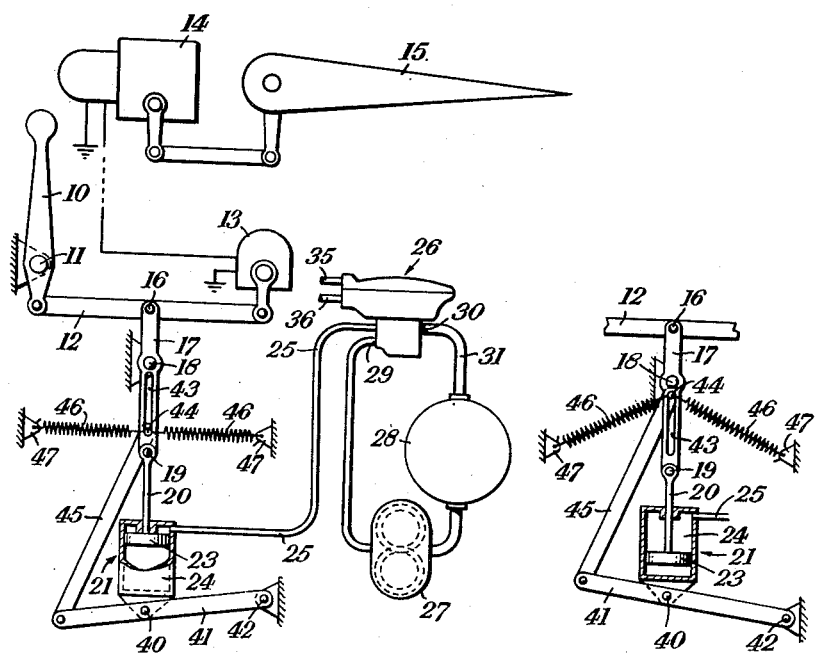
Figure 3:
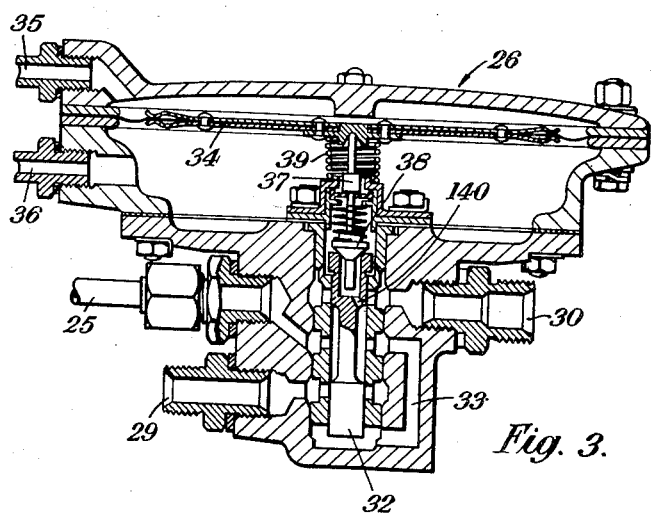
Figure 4:
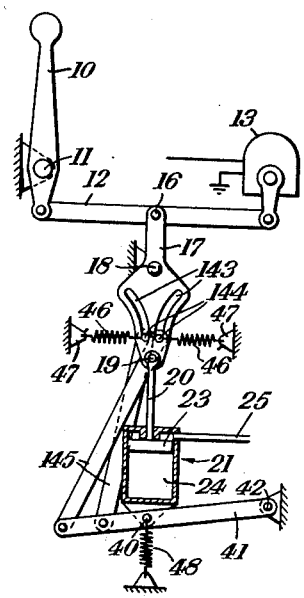
Figure 6:
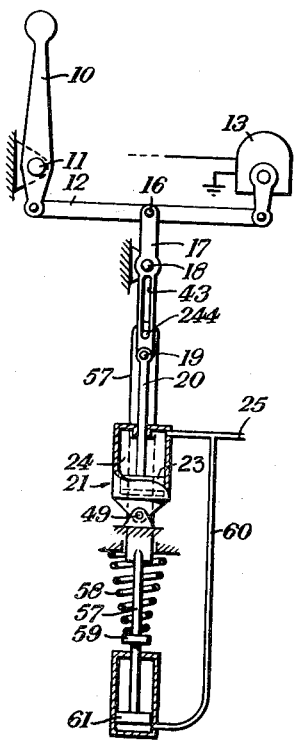
Figure 5:
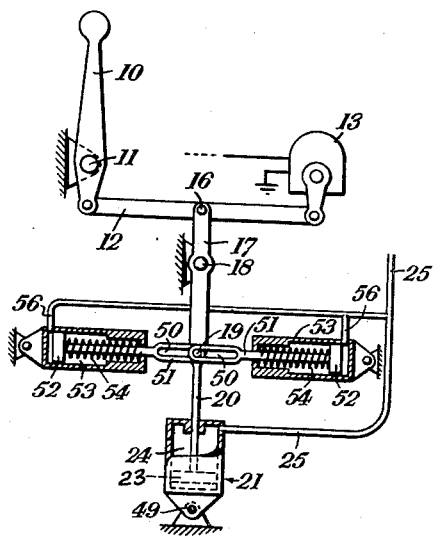

Certain specific embodiments of the invention will now be described in more detail, by way of example, with reference to the accompanying drawings, in which:

Fig. 1 is a diagram showing the first embodiment, the parts being shown in the positions they occupy when there is no hydraulic pressure in the jack, Fig. 2 is a view of a portion of the arrangement of Fig. 1, showing the parts in the positions they assume when there is hydraulic pressure in the jack, Fig. 3 is a longitudinal section through the control unit of the feel simulator, and Figs. 4–6 are diagrams showing alternative arrangements for providing mechanical feel when the hydraulic pressure fails, the parts in each case being shown in the positions they occupy when there is no hydraulic pressure in the jack.

Like reference numerals indicate like parts throughout the figures.

The feel simulator shown in Figs. 1–3 resembles in many respects that described in United States application No. 407,536/1954, now Patent No. 2,783,006. A pilot's control member 10, pivotally mounted at 11, is shown connected by a link 12 to the transmitter 13 of a servo mechanism for actuating, through a receiver 14, a control surface 15 of the aircraft. As will be understood, the servo mechanism 13, 14 serves to displace the control surface 15 in a direction and to an extent determined by the movement imparted to the control member 10.

The link 12 is pivoted at 16 to a feel lever 17, pivoted intermediately on a fixed fulcrum 18 and pivoted at its other end 19 to the piston rod 20 of a hydraulic jack 21. Movement of control member 10 in either direction will accordingly tend to draw the piston 23 of the jack upwardly in the jack cylinder 24 to expel liquid from the cylinder through a signal line 25 connecting the jack to a control unit 26, which determines the hydraulic pressure prevailing in the jack. A pump 27, drawing liquid from a reservoir 28, supplies liquid under pressure to the inlet 29 of the control unit, which has an exhaust outlet 30 communicating, via a conduit 31, with the reservoir.

As shown in Fig. 3, and more fully explained in United States application No. 407,536/1954, now Patent No. 2,783,006, the unit 26 contains a piston-type control valve 32, subject at its undersurface to the hydraulic pressure in the jack, which is applied thereto through a passage 33. A diaphragm 34, is subjected at its upper surface to pitot pressure applied through an inlet 35 and at its undersurface to static pressure applied through an inlet 36, operates on the control valve 32 through a push rod 37. On increase in the airspeed, the diaphragm 34 will move the control valve down, connecting the signal line 25 to the pressure inlet 29, whereupon the hydraulic pressure in the jack will rise to a value at which it again balances the pressure exerted by the diaphragm and returns the control valve to the neutral position shown. Similarly, on decrease in the airspeed, the control valve 32 will rise, connecting the signal line 25 to the exhaust outlet 30 and allowing the hydraulic pressure in the jack to fall to a value appropriate to the reduced airspeed. The unit 26 thus maintains a hydraulic pressure in the jack 21 which increases progressively with airspeed. When the pilot's control member 10 is moved, the control valve 32 in the unit 26 will move accordingly to allow liquid to flow into or out of the jack as required. The unit 26 includes a relief valve 38, subject through a passage 140 to the signal line pressure. This valve opens against a spring 39 in the event of the hydraulic pressure in the jack becoming excessive due to seizure of the control valve 32.

Means may be provided, as described in United States application No. 407,536/1954 and application No. 458,334/1954, now Patent No. 2,788,185, for adjusting the unit 26 to modify the hydraulic feel imposed by the jack when a given airspeed or Mach number is attained.

As indicated in Fig. 1, the end of the cylinder is pivoted at 40 to a control lever 41, pivoted at one end to a fixed fulcrum 42. The feel lever 17 has a longitudinal slot 43, engaged by a pin 44 which is coupled by a link 45 to the other end of the control lever 41. The pin 44 is coupled to the ends of two opposed tension springs 46, the other ends of which are attached to fixed anchorages 47. When there is no hydraulic pressure in the jack, the pin 44 occupies the end of the slot 43 nearer the jack, as shown in Fig. 1, and the springs 46 extend transversely to the feel lever 17, so opposing movement of the control member 10 in either direction and providing a fixed level of mechanical feel. When, however, hydraulic pressure prevails in the jack, the later extends, as shown in Fig. 2, rocking the control lever 41 to move the pin 44, via the link 45, to the end of the slot 43 remote from the jack, which is close to the fulcrum 18 of the feel lever 17. The springs 46 then extend at an acute angle to the feel lever 17 and, since they act at a point so close to the fulcrum 18, they offer no substantial resistance to movement of the control member 10, the feel being hydraulic. On failure of the pressure in the jack, however, the springs 46 return the pin 44 to the other end of the slot 43 and so take over the duty of imposing feel.

As an alternative, and in order to reduce the length of the springs, the feel lever 17 may, as shown in Fig. 4, be formed with two banana shaped slots 143, which contain pins 144 attached respectively to the springs 46 and to separate links 145 attached to the free end of the control lever 41. The slots 143 may be shaped to extend the springs 46 slightly as they move to ineffective position, so that they will automatically move back to effective position when the hydraulic pressure fails. Alternatively the slots 143 may be arcs struck from the centres constituted by the anchorages 47 of the springs 46, a return spring 48 being provided, as shown, on the control lever 41 for returning the feel springs 46 to effective position when the pressure fails.

In the arrangement shown in Fig. 5, the cylinder 24 of the jack is pivoted to a fixed fulcrum 49 and the pivot pin 19 connecting the feel lever 17 to the piston rod 20 engages in slots 50 in the ends of a pair of bars 51 extending transversely to the feel lever 17. The bars 51 carry at their other ends pistons 52, each movable in a cylinder 53, and compression springs 54 act on the pistons 52 so as to urge the inner ends of the slots 50 into contact with the pivot pin 19, as shown. These springs 54 are then effective to oppose movement of the control member 10. The hydraulic pressure in the signal line 25 is supplied, via conduits 56, to the cylinders 53, so that so long as pressure is available in this line the bars 51 are forced inwards to positions such that the pivot pin 19 may move freely in the slots 50. The springs 54 are then ineffective but they move to effective position as soon as the pressure in the supply line fails.

In the arrangement of Fig. 6, the remote end of the cylinder is again pivoted on a fixed fulcrum 49. The feel lever 17 has a longitudinal slot 43 containing a pin 244 on the end of a link 57 extending parallel to the piston rod 20. A spring 58 acts on a collar 59 fitted to the link 57 and by oposing movement of the pin 244 in the slot 43 opposes movement of the control member as shown. When, however, hydraulic pressure is available in the signal line 25, it acts, through a conduit 60 and on a piston 61 connected to the end of the link 57, in opposition to the spring 58, so lifting the link 57 to a position in which the pin 244 is at the end of the slot 43 which is close to the fulcrum 18. The spring 58 is then ineffective to resist movement of the control member. On failure of the pressure, however, the spring 58 returns to effective position.

What we claim as our invention and desire to secure by Letters Patent is:

1. A feel simulator for an aircraft having a control surface, a pilot's control member and servo mechanism operable by said control member to impart movement to said control surface, said feel simulator comprising a hydraulic jack, constituted by a piston and a housing for said piston, means responsive to airspeed for establishing in said housing a hydraulic pressure which increases with airspeed, a linkage operable by said control member to effect relative movement of the piston and housing in opposition to the hydraulic pressure in the housing, a system of springs biased to an operative position in which said springs offer resistance to movement of the control member and movable to a displaced position in which said springs are ineffective, and means responsive to the hydraulic pressure in the housing for maintaining said system of springs in ineffective position so long as hydraulic pressure prevails in said housing.

2. A feel simulator for an aircraft having a control surface, a pilot's control member and servo mechanism operable by said control member to impart movement to said control surface, said feel simulator comprising a hydraulic jack, constituted by a piston and a housing for said piston, means responsive to airspeed for establishing in said housing a hydraulic pressure which increases with airspeed, a piston rod connected to said piston, an intermediately pivoted feel lever pivoted at one end to said piston rod, a linkage connecting the other end of the feel lever to the control member, said linkage being operable by the control member to move the piston against the hydraulic pressure in the housing, a pin engaging a slot in the feel lever, said slot having an end near the intermediate pivot of the feel lever and an end remote from said intermediate pivot, spring means extending between said pin and a fixed anchorage, said spring means normally maintaining said pin at the remote end of the slot, and means responsive to the hydraulic pressure in the housing for counteracting said spring means and shifting said pin to the near end of the slot when hydraulic pressure prevails in the housing.

3. A feel simulator for an aircraft having a control surface, a pilot's control member and servo mechanism operable by said control member to impart movement to said control surface, said feel simulator comprising a hydraulic jack, constituted by a piston and a housing for said piston, means responsive to airspeed for establishing in said housing a hydraulic pressure which increases with airspeed, a piston rod connected to said piston, an intermediately pivoted feel lever pivoted at one end to said piston rod, a linkage connecting the other end of the feel lever to the control member, said linkage being operable by the control member to move the piston against the hydraulic pressure in the housing, a pin engaging a slot in the feel lever, said slot having an end near the intermediate pivot of the feel lever and an end remote from said intermediate pivot, spring means extending between said pin and a fixed anchorage, means responsive to hydraulic pressure in the housing for shifting said pin to the near end of the slot when hydraulic pressure prevails in the housing and means for shifting said pin to the remote end of the slot in the absence of hydraulic pressure in the housing.

4. A feel simulator for an aircraft having a control surface, a pilot's control member and servo mechanism operable by said control member to impart movement to said control surface, said feel simulator comprising a hydraulic jack, constituted by a piston and a housing for said piston, means responsive to airspeed for establishing in said housing a hydraulic pressure which increases with airspeed, a piston rod connected to said piston, an intermediately pivoted feel lever pivoted at one end to said piston rod, a linkage connecting the other end of the feel lever to the control member, said linkage being operable by the control member to move the piston against the hydraulic pressure in the housing, a pin engaging a slot in the feel lever, said slot having an end near the intermediate pivot of the feel lever and an end remote from said intermediate pivot, a pair of springs disposed on opposite sides of the feel lever, each spring being attached at one end to said pin and at the other end to a fixed anchorage, said springs normally extending substantially at right angles to said feel lever and maintaining said pin at the remote end of the slot and means connected to the pin and responsive to the hydraulic pressure in the housing, said means displacing said pin to the near end of the slot when hydraulic pressure prevails in the housing.

5. A feel simulator according to claim 2, wherein said responsive means comprises a control lever pivoted at one end to a fixed anchorage and pivoted intermediately to said housing and a link connecting the other end of the control lever to the pin.

6. A feel simulator for an aircraft having a control surface, a pilot's control member and servo mechanism operable by said control member to impart movement to said control surface, said feel simulator comprising a hydraulic jack, constituted by a piston and a housing for said piston, means responsive to airspeed for establishing in said housing a hydraulic pressure which increases with airspeed, a piston rod connected to said piston, an intermediately pivoted feel lever pivoted at one end to said piston rod, a linkage connecting the other end of the feel lever to the control member, said linkage being operable by the control member to move the piston against the hydraulic pressure in the housing, pins engaging curved slots in the feel lever, said slots having ends near the intermediate pivot of the feel lever and ends remote from said intermediate pivot, springs extending between said pins and fixed anchorages, said springs normally maintaining the pins at the remote ends of the slots, and means responsive to the hydraulic pressure in the housing for counteracting said springs and shifting said pins to the near ends of the slots when hydraulic pressure prevails in the housing.

7. A feel simulator according to claim 6, wherein the slots are struck to radii from the anchorages of said springs and comprising a return spring for returning the pins to the remote ends of the slots on failure of the hydraulic pressure in the housing.

8. A feel simulator for an aircraft having a control surface, a pilot's control member and servo mechanism operable by said control member to impart movement to said control surface, said feel simulator comprising a hydraulic jack, constituted by a piston and a housing for said piston, means responsive to airspeed for establishing in said housing a hydraulic pressure which increases with airspeed, a piston rod connected to said piston, an intermediately pivoted feel lever, a pin connecting one end of said feel lever to said piston rod, a linkage connecting the other end of the feel lever to the control member, said linkage being operable by the control member to move the piston against the hydraulic pressure in the housing, a pair of slotted bars disposed on opposite sides of the feel lever with their slots engaging said pin, springs urging said bars to position to impose mechanical resistance to movement of the feel lever, and means subject to the hydraulic pressure in the housing for displacing said bars against their springs to an ineffective position, in which mechanical resistance to movement of the feel lever is removed, when hydraulic pressure prevails in the housing.

9. A feel simulator for an aircraft having a control surface, a pilot's control member and servo mechanism operable by said control member to impart movement to said control surface, said feel simulator comprising a hydraulic jack, constituted by a piston and a housing for said piston, means responsive to airspeed for establishing in said housing a hydraulic pressure which increases with airspeed, a piston rod connected to said piston, an intermediately pivoted feel lever pivoted at one end to said piston rod, a linkage connecting the other end of the feel lever to the control member, said linkage being operable by the control member to move the piston against the hydraulic pressure in the housing, a lever extending parallel to the feel lever, a pin on said parallel lever engaging a slot in the feel lever, said slot having an end near the intermediate pivot of the feel lever and an end remote from said intermediate pivot, a spring urging said pin to the remote end of the slot and normally resisting movement of the feel lever, and means subject to the hydraulic pressure in the housing for displacing said pin against said spring to the near end of the slot when hydraulic pressure prevails in the housing.

10. A feel simulator for an aircraft having a control surface, a pilot's control member and servo mechanism operable by said control member to impart movement to said control surface, said feel simulator comprising a first feel system for imposing a hydraulic resistance to movement of said control member, a device responsive to airspeed and arranged to increase with increase in airspeed the feel provided by said first feel system, a normally ineffective second feel system, and means responsive to the hydraulic pressure supplied to said first feel system for automatically rendering said second feel system effective, on failure of said hydraulic pressure, to impose on the control member a mechanical resistance to movement which is independent of airspeed.

References Cited in the file of this patent

UNITED STATES PATENTS

| | | |
|---|---|---|
| 2,508,883 | Knowler et al. | May 23, 1950 |
| 2,548,481 | Knowler et al. | Apr. 10, 1951 |
| 2,724,565 | Trevaskis | Nov. 22, 1955 |